US012385287B2

(12) United States Patent
Chen

(10) Patent No.: US 12,385,287 B2
(45) Date of Patent: Aug. 12, 2025

(54) DOOR LOCK MECHANISM

(71) Applicant: PRO DECOR LLC, Ontario, CA (US)

(72) Inventor: Jian Chen, Ontario, CA (US)

(73) Assignee: PRO DECOR LLC, Ontario, CA (US)

( * ) Notice: Subject to any disclaimer, the term of this patent is extended or adjusted under 35 U.S.C. 154(b) by 105 days.

(21) Appl. No.: 18/473,532

(22) Filed: Sep. 25, 2023

(65) Prior Publication Data

US 2025/0101772 A1 Mar. 27, 2025

(51) Int. Cl.

*E05B 55/00* (2006.01)
*E05B 1/00* (2006.01)
*E05B 55/06* (2006.01)

(52) U.S. Cl.

CPC ............ *E05B 55/005* (2013.01); *E05B 1/003* (2013.01); *E05B 55/06* (2013.01)

(58) Field of Classification Search

CPC ........ E05B 55/00; E05B 55/005; E05B 55/06; E05B 1/00; E05B 1/003; E05B 3/00; E05B 13/101; E05B 13/106; E05B 47/0676

USPC ............................................................ 70/244

See application file for complete search history.

(56) References Cited

U.S. PATENT DOCUMENTS 4,255,953 A * 3/1981 Dietrich ................ E05B 55/005 70/482
4,333,324 A * 6/1982 Dietrich ................ E05B 55/005 292/172
5,177,987 A * 1/1993 Shen ..................... E05B 55/005 292/336.5
5,385,374 A * 1/1995 Fann ..................... E05B 55/005 292/351
5,482,335 A * 1/1996 Zuckerman ........... E05B 55/005 292/358
5,598,726 A * 2/1997 Cordle .................. E05B 55/005 292/336.3
5,657,653 A * 8/1997 Hensley ................ E05B 55/005 70/222
7,364,212 B1 * 4/2008 Fan ......................... E05B 1/003 292/336.3
11,359,407 B2 * 6/2022 Kaverina ................ E05B 41/00
2002/0003350 A1 * 1/2002 Fayngersh ............ E05B 63/044 292/165
2003/0127864 A1 * 7/2003 Dalsing ................... E05B 63/16 292/169.14
2004/0084909 A1 * 5/2004 Kondratuk .............. E05B 55/00 292/169
2006/0243008 A1 * 11/2006 Etlicher .................. E05B 63/04 70/101
2013/0239631 A1 * 9/2013 Moon .................. E05B 55/005 70/266
2014/0196509 A1 * 7/2014 Moon ................. E05B 17/2092 70/1.5
2018/0187454 A1 * 7/2018 Moon ..................... E05B 59/00
2020/0109578 A1 * 4/2020 Lunday ................. E05B 55/005
2020/0224468 A1 * 7/2020 Horwood ................ E05C 9/047
2020/0270900 A1 * 8/2020 Lin ......................... E05B 17/10
2021/0079688 A1 * 3/2021 Shumaker ............. E05B 13/101

(Continued)

*Primary Examiner* — Nathan Cumar

(74) *Attorney, Agent, or Firm* — Vista IP Law Group LLP

(57) ABSTRACT

Improved door lock mechanisms and kit for assembly into the same. The door lock mechanisms include a guide sleeve having a tapered portion for guiding a locking lever into a cross-hole of a locking bar. The cross-hole also allows the locking lever to be inserted into the cross-hole at multiple different orientations of the locking bar.

16 Claims, 5 Drawing Sheets

(56) References Cited

U.S. PATENT DOCUMENTS

| | | | | |
|---|---|---|---|---|
| 2021/0222465 | A1* | 7/2021 | Cheng | E05B 57/00 |
| 2021/0277684 | A1* | 9/2021 | Moon | E05B 55/005 |

* cited by examiner

DOOR LOCK MECHANISM

BACKGROUND

The field of the invention generally relates to door handle mechanisms, and more specifically to a door handle lock mechanism that provides for easy and quick installation and allows variable installation orientations for a locking knob when the door handle lock mechanism is installed on a door.

A conventional residential door lock mechanism typically includes an outer handle configured to be positioned on the outside of the door, and an inner handle coupled to the outer handle and configured to be positioned on the inside of the door. The outer handle and inner handle are coupled to a door latch bolt such that rotating the outer handle and inner handle retract and extend the door latch bolt. In a closed state, the door latch bolt is extended to engage with a strike plate mounted in a door jamb in which the door is installed. In an open state, the door latch bolt is retracted from the strike plate thereby allowing the door to be opened. The door lock mechanism may also have a locking feature. When the locking feature is in a locked state, the outer handle is locked from retracting the door latch bolt such that the door latch bolt cannot be retracted by turning the outer handle. The locking feature may operate in various ways. For one, the locking feature may prevent the outer handle from being turned to retract the door latch bolt. Alternatively, the locking feature may be a clutch mechanism that is configured to disengage the outer handle from the door latch bolt such that turning the outer handle does not retract the door latch bolt.

Referring to FIGS. 1-4, one example of a conventional residential door lock mechanism 10 is illustrated. The door lock mechanism includes an outer handle 12 and an inner handle 14. A locking knob 16 is inserted through the inner handle 14 into a cylinder 18 of the inner handle 14. The locking knob 16 has a knob slot 20 for receiving a safety locking lever 22. The locking lever 22 is coupled to a locking mechanism 24 which is configured to lock and unlock the outer handle 12 depending on the position of the locking lever 22. The locking knob 16 is rotatable from an unlocked position (with the flat sides of the locking lever 22 oriented vertically) as shown in FIG. 1, to a locked position (with the flat sides of the locking lever 22 oriented horizontally). When the locking knob 16 is rotated from the unlocked position to the locked position, the locking knob 16 rotates the locking lever 22 from an unlocked position to a locked position, which in turn actuates the locking mechanism 24 from an unlocked position to a locked position. Turning the locking knob 16 from the locked position to the unlocked position rotates the locking lever 22 from the locked position to the unlocked position, which in turn actuates the locking mechanism 24 from the locked position to the unlocked position.

As shown in FIG. 3, if the locking knob 16 is rotated to the locked position during installation and assembly of the door lock mechanism 10, the locking lever 22 cannot be inserted into the knob slot 20. Similarly, as shown in FIG. 4, if the outer handle 12 is tilted or slanted during assembly, the locking lever 22 also cannot be inserted into the knob slot.

Accordingly, during assembly of the door lock mechanism 10, if the locking lever 22 is not inserted into the knob slot 20, the door lock mechanism 10 cannot be locked and/or unlocked because the locking knob 16 is not coupled to the locking lever 22. This requires that the locking knob 16 and the locking lever 22 be precisely oriented and rotated to allow the locking lever 22 to be inserted into the locking knob 16 during assembly. This can be a very difficult and frustrating task for the installer because it is a blind assembly wherein the mating locking lever 22 and locking knob are typically not visible within the door lock mechanism 10 during as they are being mated together. Furthermore, the locking knob 16 has only one possible rotational position for proper assembly.

Accordingly, there is a need for an improved door lock mechanism which provides for easier and faster installation and also allows for the locking knob to be installed at different rotational orientations as desired by the user.

SUMMARY

The present disclosure is directed to improved door lock mechanisms, and kits for being assembled into such door lock mechanisms, which allow for simple and easy installation on a door. The improved door lock mechanism may also allow for variable rotational orientations for a locking knob, as desired by the user. The improved door lock mechanisms are described herein for a residential door installation, but may be used in any suitable door lock mechanism, including residential and commercial door lock devices.

Accordingly, in one embodiment of the present invention, a door lock mechanism includes an outer handle and an inner handle each coupled to a door latch bolt such that rotating either of the outer handle and inner handle retracts and extends the door latch bolt. The door lock mechanism also includes a locking knob assembly comprising a locking knob connected to a locking bar. The locking knob is on the proximal end of the locking knob assembly and the locking bar extends distally from the locking knob to a distal end of the locking bar. As used herein, the terms "proximal" and "proximally," and "distal" and "distally" are relative to the position of the respective elements as the door lock mechanism is configured to be installed on a door, wherein "proximal" and "proximally" refer to being positioned relatively towards the interior side of the door lock mechanism and "distal" and "distally" refer to being positioned relatively towards the exterior side of the door lock mechanism. The locking knob extends proximally out of the inner handle, and the locking bar inserts into a cylinder of an inner handle. The locking bar has a longitudinal cross-hole having a cross-shaped cross-section forming two intersecting slots. The cross-hole has an open end at the distal end of the locking bar and is configured to receive a proximal portion of a locking lever (also called a bumper) in multiple orientations. The locking lever is a flat bar which can be inserted into the cross-hole of the locking bar in different orientations such that the locking lever inserts into either of the two intersecting slots formed by the cross-hole. In one aspect, the cross-hole is formed by two slots intersecting at a 90 degree angle, such that the locking lever may insert into the cross-hole in a first rotational orientation and a second rotational orientation rotated 90 degrees from the first rotational orientation.

A proximal end of the locking lever is coupled to a locking mechanism. The locking mechanism is configured to lock and unlock the outer handle and is actuated between a locked state and an unlocked state by rotation of the locking lever. The locking knob assembly and coupled locking lever are together rotatable between an unlocked position and a locked position which in turn actuates the locking mechanism between an unlocked state and a locked state. In the unlocked state, the locking mechanism enables the outer handle to retract the door latch bolt and in the locked state the locked mechanism prevents the outer handle from retracting the door latch bolt.

The door lock mechanism also includes a guide sleeve disposed in the cylinder of the inner handle. The guide sleeve has a proximal tube portion which receives the distal end of the locking bar such that the open end of the cross-hole is within the proximal tube portion. The guide sleeve also has a distal tapered portion extending from a distal end of the proximal tube portion which tapers radially outward as the distal tapered portion extends distally. The guide sleeve functions as a guide to direct the locking lever into the cross-hole of the locking bar during assembly. For instance, when assembling the outer handle and spindle to the inner handle during installation of the door lock mechanism onto a door, if the locking lever is misaligned, slanted and/or tilted relative to the cross-hole in the locking bar, the guide sleeve directs the proximal end of the locking lever towards the cross-hole and aligns the locking lever with the cross-hole such that the locking lever can be easily and reliably inserted into the cross-hole during assembly, even during the blind assembly process.

In another aspect, the door lock mechanism further includes a guide sleeve stop disposed within the cylinder of the inner handle distal of the distal tapered portion of the guide sleeve. The guide sleeve stop is configured to hold the guide sleeve in place within the cylinder of the inner handle.

In still another aspect, the locking bar comprises a cylindrical body with the cross-hole extending longitudinally within the cylindrical body.

In yet another aspect, the locking mechanism is configured such that in the locked state the locking mechanism prevents the outer handle from being rotated to retract the door latch bolt, and in the unlocked state the locking mechanism allows the outer handle to be rotated to retract the door latch bolt.

In another aspect, the locking mechanism comprises a clutch mechanism that is configured such that in the locked state the outer handle is disengaged from the door latch bolt such that rotating the outer handle does not retract the door latch bolt, and in the unlocked state the outer handle is engaged to the door latch bolt such that rotating the outer handle retracts the door latch bolt.

In yet another aspect, the inner handle and outer handle each comprise a door knob.

In still another aspect, the inner handle and outer handle each comprise a door lever.

Another embodiment disclosed herein is a door lock mechanism kit comprising the components of any of the door lock mechanisms disclosed herein for assembly into a door lock mechanism. The components of the kit may comprise the elements of the door lock mechanism in any state of sub-assembly of the elements. For instance, in one example, a first component of the kit may comprise the outer handle, locking mechanism and lever assembled together and a second component of the kit may comprise the inner handle, locking knob assembly and guide sleeve.

Accordingly, improved door lock mechanisms are disclosed herein which overcome some of the drawbacks of previous devices. For example, the improved door lock mechanisms are not restricted to a single orientation of the locking knob, and also have a guide sleeve for aligning the locking lever to the cross-hole during assembly thereby allowing for easy and quick installation.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant. These drawings are not necessarily drawn to scale. In order to better appreciate how the above-recited and other advantages and objects are obtained, a more particular description of the disclosure will be rendered, which is illustrated in the accompanying drawings. These drawings depict only exemplary aspects of the disclosure for purposes of illustration and facilitating the below detailed description, and are not therefore to be considered limiting of its scope.

DETAILED DESCRIPTION

Figure 1:
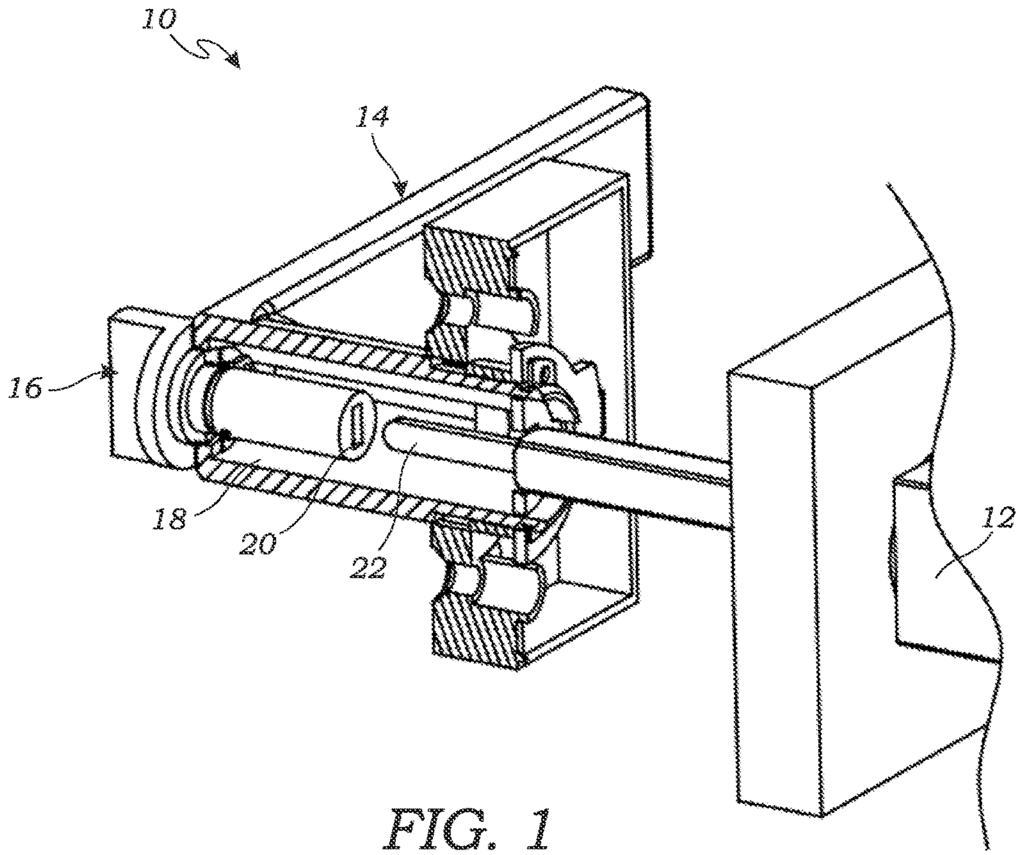
FIG. 1 is a side, perspective, partial cross-sectional view of a disassembled prior art door lock mechanism.
Figure 2:
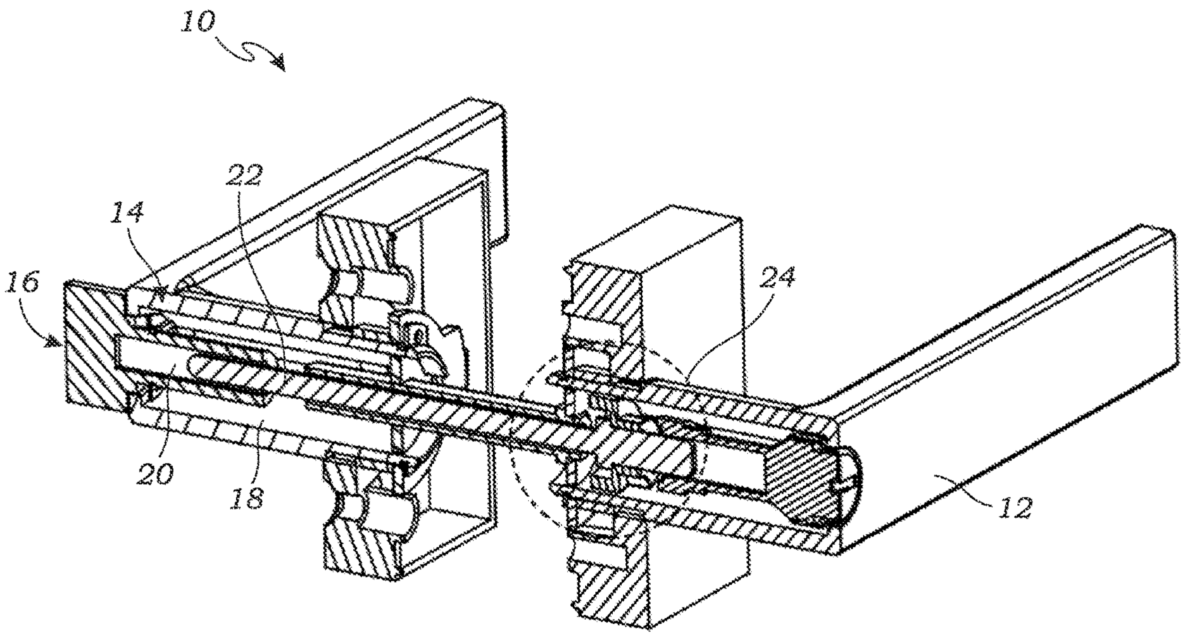
FIG. 2 is a side, perspective, partial cross-sectional view of the prior art door lock mechanism of FIG. 1 in an assembled configuration.
Figure 3:
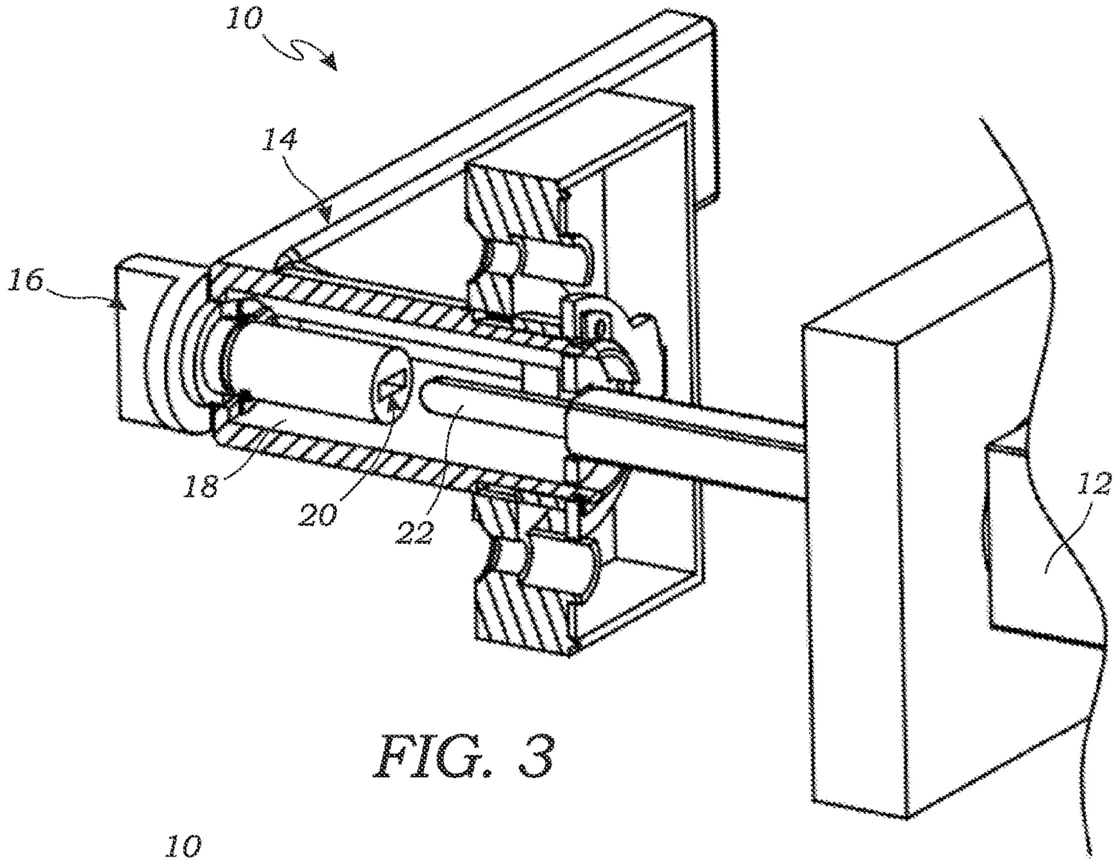
FIG. 3 is a side, perspective, partial cross-sectional view of the disassembled prior art door lock mechanism of FIG. 1 with the locking knob misaligned from the locking lever.
Figure 4:
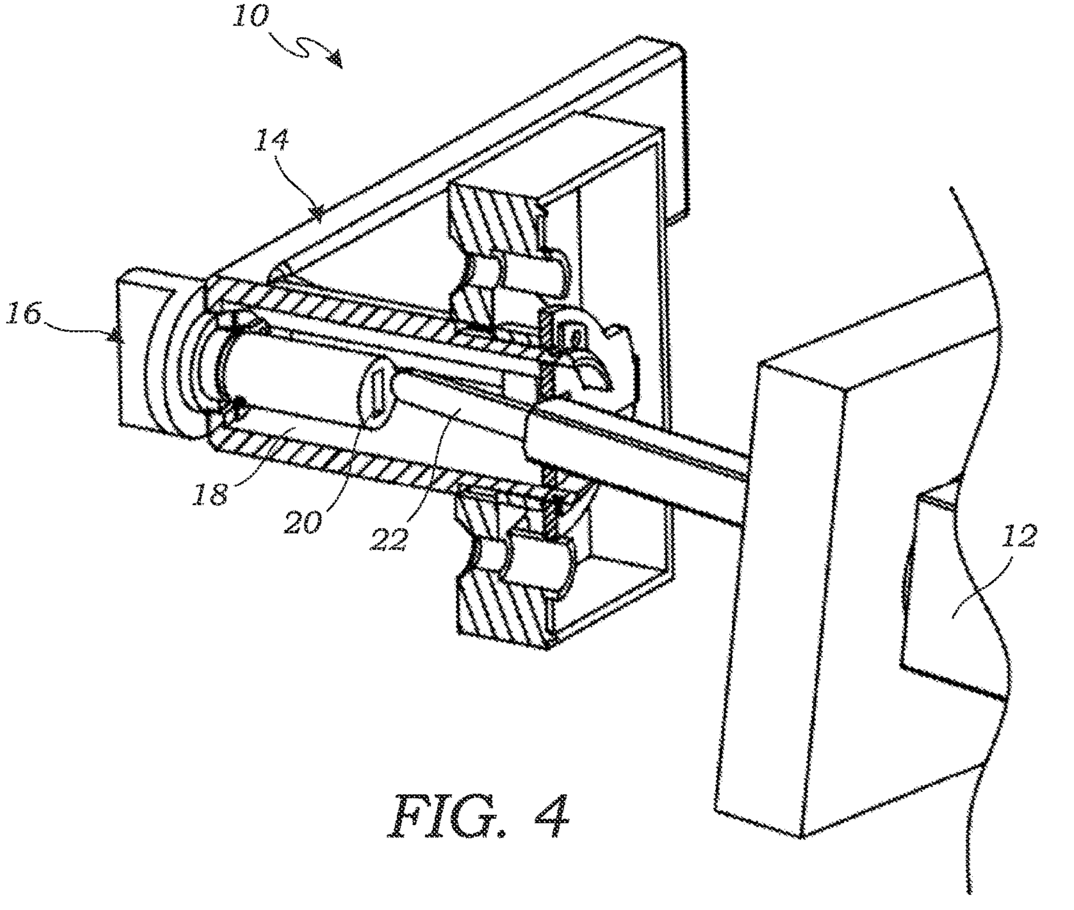
FIG. 4 is a side, perspective, partial cross-sectional view of the disassembled prior art door lock mechanism of FIG. 1 with the locking lever tilted relative to the locking knob during assembly.

This specification describes exemplary embodiments, aspects and applications of the disclosure. The disclosure, however, is not limited to these exemplary embodiments, aspects and applications or to the manner in which the exemplary embodiments, aspects and applications operate or are described herein. Further, the figures may show simplified or partial views, and the dimensions of elements in the figures may be exaggerated or otherwise not in proportion. Moreover, elements of similar structures or functions are represented by like reference numerals throughout the figures. In addition, an illustrated aspect need not have all the features or advantages shown. A feature or an advantage described in conjunction with a particular aspect is not necessarily limited to that aspect, and can be practiced in any other aspect even if not so illustrated.

Figure 5:
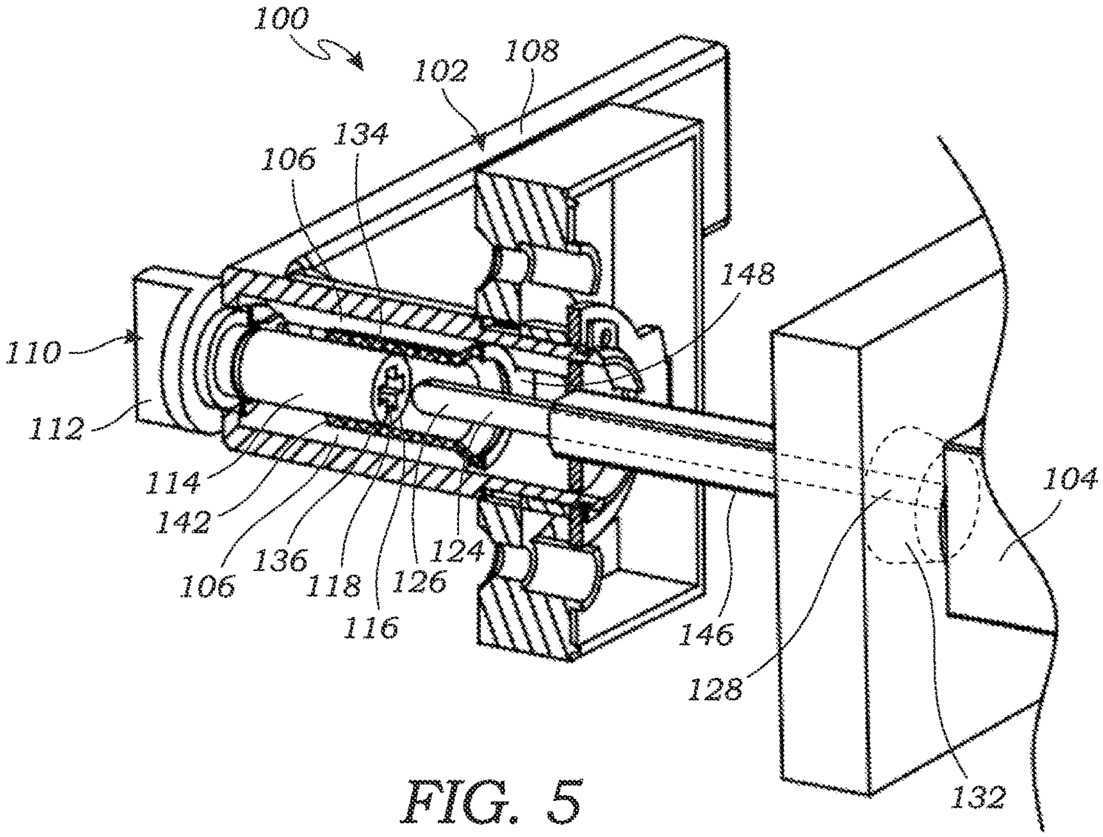
FIG. 5 is a side, perspective, partial cross-sectional view of a disassembled door lock mechanism according to one embodiment disclosed herein.

Referring to FIG. 5, a door lock mechanism 100 according to one disclosed embodiment disclosed herein is illustrated. The door lock mechanism 100 includes an inner handle 102 and an outer handle 104. The inner handle is 102 coupled to a door latch bolt (not shown) such that rotating the inner handle 102 retracts and extends the door latch bolt to unlatch and latch the door latch bolt to a mating strike plate (not shown) mounted on a door jamb. The outer handle 104 is also coupled to the door latch bolt such that rotating the outer handle 104 retracts and extends the door latch bolt to unlatch and latch the door latch bolt to the mating strike plate. As described in more detail below, the outer handle 104 may be releasably coupled to the door latch bolt and/or lockable via a locking mechanism 132 to prevent the outer handle 104 from being able to retract the door latch bolt.

The inner handle 102 includes a proximal handle portion 108 connected to a cylinder 106 forming a cylindrical cavity which extends distally from the handle portion 108 along a longitudinal axis.

Figure 6:
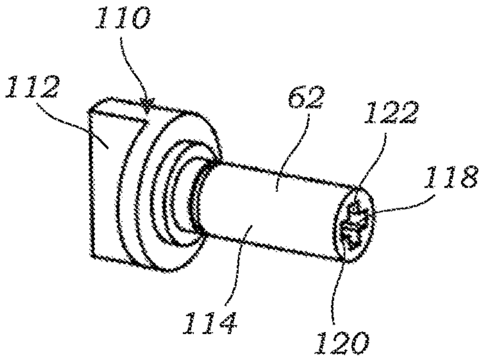
FIG. 6 is a side, perspective view of the locking knob assembly of the door lock mechanism of FIG. 5.

Referring to FIGS. 5 and 6, the door lock mechanism 100 also includes a locking knob assembly 110. The locking knob assembly 110 has a locking knob 112 on the proximal end of the locking knob assembly 110 and a locking bar 114 connected to the locking knob 112 extending distally from the locking knob 112. The locking knob 114 is on the proximal end of the locking knob assembly 110 and the locking bar 114 extends distally from the locking knob 112 to a distal end 116 of the locking bar 114. The locking knob 114 is accessible on the proximal side of the inner handle 108, such as by extending proximally out of the inner handle 108. The locking bar 114 inserts into the cylinder 106 of the inner handle 108.

The locking bar 114 has a longitudinal cross-hole 118 extending along the longitudinal axis of the locking bar 114. The cross-hole 118 has a cross-shaped cross-section forming two intersecting slots 120, 122 slots which intersect at a 90 degree angle (i.e., orthogonal to each other). Alternatively, the intersecting slots 120, 122 may intersect at any other suitable angle, such as a 60 degree angle, or 45 degree angle, etc. In the rotational position of the locking bar 114 as shown in FIGS. 5 and 6, the first slot 120 is horizontal and the second slot 122 is vertical. The cross-hole 118 has an open end at the distal end 116 of the locking bar 114. The cross-hole 118 of the locking bar 114 is configured to receive a proximal portion 126 of a locking lever 124 (also called a bumper 124). The locking lever 124 is a flat bar. Accordingly, the cooperating configurations of the locking lever 124 and cross-hole 118 allow the locking lever 124 to be inserted into the cross-hole 118 of the locking bar 114 in different orientations such that the locking lever inserts into either of the two intersecting slots 120, 122 formed by the cross-hole 118. In other words, the locking lever 124 can be inserted into the first slot 120 of the cross-hole 118 in a first rotational orientation (the locking lever 124 is horizontal when inserted into the first slot 120 in the arrangement of the door lock mechanism 100 in FIG. 5), or the locking lever 124 can be inserted into the second slot 122 in a second rotation orientation (the locking lever 124 is vertical (i.e., rotated 90 degrees from the first rotational orientation) when inserted into the second slot 122 in the arrangement of the door lock mechanism 100 in FIG. 5).

The locking lever 124 has a proximal end 128 which is coupled to a locking mechanism 132. The locking mechanism 132 is configured to lock and unlock the outer handle 104 and is actuated by the locking lever 124 between a locked state and an unlocked state by rotation of the locking lever 124. In the unlocked state, the locking mechanism 132 enables the outer handle 104 to retract the door latch bolt and in the locked state the locked mechanism 132 prevents the outer handle 104 from retracting the door latch bolt. The locking bar 114 of the locking knob assembly 132 and locking lever 124 are coupled together via the cross-hole 118 and are together rotatable between an unlocked position which actuates the locking mechanism 132 to the unlocked state, and a locked position which actuates the locking mechanism 132 to the unlocked state. The locking knob 112 of the locking knob assembly 110 can be manually rotated by a user to rotate the locking lever 124 between the unlocked position and the locked position to actuate the locking mechanism 132 between the unlocked state and the locked state, respectively.

The locking mechanism 132 may be any suitable locking mechanism for unlocking and locking the door lock mechanism 100 to enable and disable the outer handle 104 to retract the door latch bolt. For example, in one embodiment, the locking mechanism 132 is configured such that in the locked state the locking mechanism 132 prevents the outer handle 104 from being rotated to retract the door latch bolt, and in the unlocked state the locking mechanism 132 allows the outer handle to be rotated to retract the door latch bolt. In another embodiment, the locking mechanism 132 comprises a clutch mechanism that is configured such that in the locked state the outer handle 104 is disengaged from the door latch bolt such that rotating the outer handle does not retract the door latch bolt, and in the unlocked state the outer handle 104 is engaged to the door latch bolt such that rotating the outer handle 104 retracts the door latch bolt.

Figure 7:
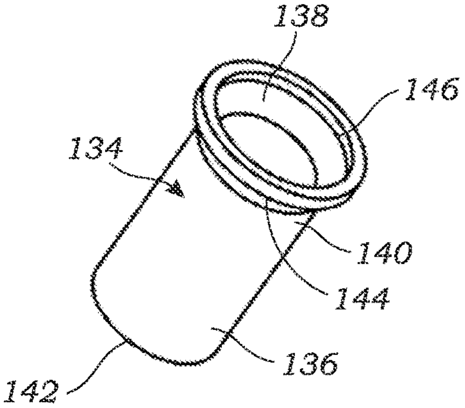
FIG. 7 is a side, perspective view of the guide sleeve of the door lock mechanism of FIG. 5.

Referring to FIGS. 5 and 7, the door lock mechanism 100 also has guide sleeve 134 for guiding the locking lever 124 into the cross-hole 118 during assembly of the door lock mechanism 100. The guide sleeve 134 is disposed longitudinally within the cylinder 106 of the inner handle 102. The guide sleeve 134 comprises a proximal tube portion 136 having an open proximal end 142 and a distal end 140. The proximal tube portion 136 receives the distal end 116 of the locking bar 114 such that the open end of the cross-hole 118 is received within the proximal tube portion 136. In other words, the locking bar 114 inserts into the proximal tube portion 136 of the guide sleeve 134. The distal end 116 of the locking bar 114 is proximal of the distal end of the proximal tube portion 136 such that the locking bar 114 does not extend distally past the distal end of the proximal tube portion 136. The guide sleeve 134 also has a distal tapered portion 138 extending from a distal end 140 of the proximal tube portion 136. The distal tapered portion 138 has a proximal end 144 having an inner diameter substantially the same as an inner diameter of the proximal tube portion 136. The distal tapered portion 138 tapers radially outward from the proximal end 144 as the distal tapered portion 138 extends distally to a distal end 146 which has an inner diameter that is larger than the inner diameter of the proximal end 144. The door lock mechanism 100 also includes a guide sleeve stop 148 disposed within the cylinder 106 of the inner handle 102. The guide sleeve stop 148 is positioned just distal of the distal end 146 of the distal tapered portion 138 and is fixed to the cylinder 106. The guide sleeve stop 148 is configured to hold the guide sleeve 134 in place within the cylinder 106 of the inner handle 102.

Accordingly, during installation and/or assembly of the door lock mechanism 100, the guide sleeve 134 functions to guide the locking lever 124 into the cross-hole 118 of the locking bar 114. As an example, when assembling the outer handle 104 and spindle 146 to the inner handle 102 during installation of the door lock mechanism 100 onto a door, at the point that the locking lever 124 is approaching the cross-hole 118, the assembly of the locking lever 124 to the cross-hole 118 is blind because the person installing the door lock mechanism cannot see into cylinder 106. If the locking lever 124 is misaligned, slanted and/or tilted relative to the cross-hole 118, proximal portion 126 of the locking lever 124 will bear against the distal tapered portion 138 which will direct the proximal portion 126 of the locking lever towards the cross-hole 118 as it is moved proximally toward the cross-hole 118, thereby aligning the proximal portion 126 of the locking lever 124 with the cross-hole 118 until the proximal portion 126 inserts into the cross-hole 118. The locking lever 124 is then advanced proximally through the proximal tube portion 136 and into the cross-hole 118 until it is fully inserted into the cross-hole 118. Thus, the guide sleeve 134 allows the locking lever 124 to be easily and reliably inserted into the cross-hole 118 during assembly, even during the blind assembly process.

Figure 8:
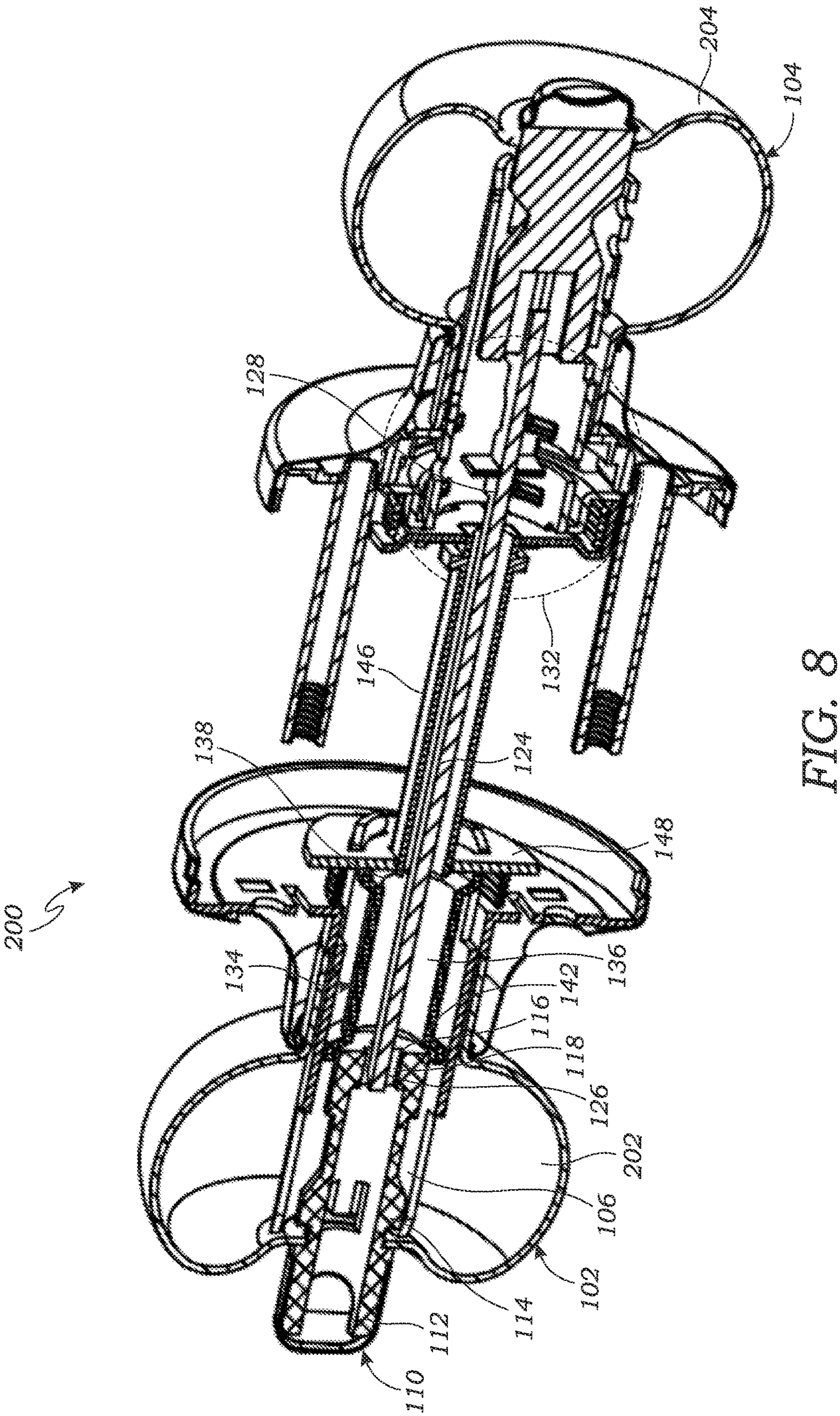
FIG. 8 is a side, perspective cross-sectional view of a door lock mechanism according to another embodiment disclosed herein.

Referring now to FIG. 8, a door lock mechanism 200 according to another embodiment disclosed herein is illustrated. The door lock mechanism 200 is the same as the door lock mechanism 100, except that in door lock mechanism 200 the inner handle comprises a door knob 202 and the outer handle comprises a door knob 204.

Figure 9:
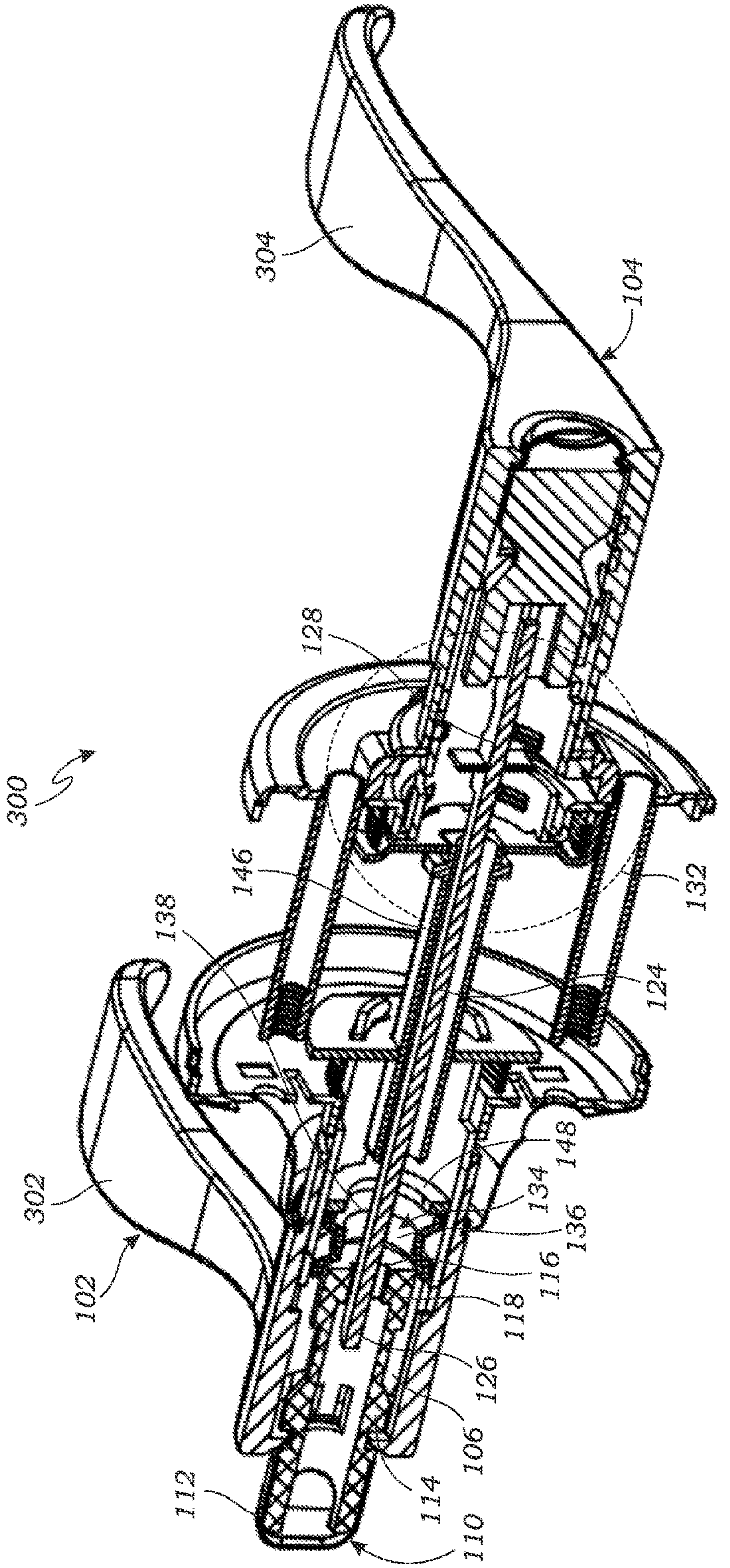
FIG. 9 is a side, perspective cross-sectional view of a door lock mechanism according to yet another embodiment disclosed herein.

Turning to FIG. 9, a door lock mechanism 300 according to yet another embodiment disclosed herein is illustrated. The door lock mechanism 300 is the same as the door lock mechanisms 100 and 200, except that in door lock mechanism 300 the inner handle comprises a door lever 302 and the outer handle comprises a door lever 304.

In another aspect, the door lock mechanisms 100, 200 and 300, as shown in FIGS. 5-9, comprise door lock mechanism kits which are configured to be assembled and installed on a door. As shown in FIGS. 5, 8, and 9, the proximal side of the door lock mechanisms 100, 200 and 300 comprise a first kit component, and the distal side of the door lock mechanisms 100, 200 and 300, comprise a second kit component. The first kit component and second kit component can be assembled together and installed on a door, as described herein.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:

1. A door lock mechanism, comprising:

an outer handle operably coupled to a door latch bolt such that rotating the outer handle retracts the door latch bolt;

an inner handle operably coupled to the door latch bolt such that rotating the inner handle retracts the door latch bolt, the inner handle comprising a handle portion connected to a cylinder, the cylinder forming a cylindrical cavity which extends distally from the handle portion along a longitudinal axis;

a locking knob assembly comprising a locking knob connected to a locking bar, the locking knob forming a proximal end of the locking knob assembly and the locking bar extending distally from the locking knob to a distal end of the locking bar; the locking bar having a longitudinal cross-hole having a cross-shaped cross-section forming two intersecting slots such that the cross-hole can receive a locking lever in one of the intersecting slots in a first rotational orientation and the cross-hole can receive the locking lever in the other one of the intersecting slots in a second rotational orientation different than the first rotational orientation, the cross-hole having open end at the distal end of the locking bar, the locking bar rotatably received in the cylinder of the inner handle;

the locking lever comprising a flat bar having a proximal portion and a distal portion, the proximal portion of the locking lever inserted into either one of the two intersecting slots of the cross-hole, the distal portion of the locking lever operably coupled to a locking mechanism, the locking mechanism configured to be actuated between a locked state and an unlocked state by rotation of the locking lever which is rotatable by rotation of the locking knob, wherein in the locked state the locking mechanism prevents the outer handle from retracting the door latch bolt and in the unlocked state the locking mechanism enables the outer handle to retract the door latch bolt;

a guide sleeve disposed in the cylinder of the inner handle, the guide sleeve having a proximal tube portion and a distal tapered portion, the distal tapered portion extending distally from a distal end of the proximal tube portion and tapering radially outward as the distal tapered portion extends distally, the guide sleeve receiving the distal end of the locking bar such that the open end of the cross-hole is within the proximal tube portion, wherein the guide sleeve functions as a guide to direct the locking lever into the cross-hole of the locking bar during assembly of the door lock mechanism.

2. The door lock mechanism of claim 1, further comprising:

a guide sleeve stop disposed within the cylinder of the inner handle distal of the distal tapered portion of the guide sleeve, the guide sleeve stop configured to retain the guide sleeve in place within the cylinder of the inner handle.

3. The door lock mechanism of claim 1, wherein the locking bar comprises a cylindrical body with the cross-hole extending longitudinally within the cylindrical body.

4. The door lock mechanism of claim 1, wherein the locking mechanism is configured such that in the locked state the locking mechanism prevents the outer handle from being rotated to retract the door latch bolt, and in the unlocked state the locking mechanism allows the outer handle to be rotated to retract the door latch bolt.

5. The door lock mechanism of claim 1, wherein the locking mechanism comprises a clutch mechanism that is configured such that in the locked state the outer handle is disengaged from the door latch bolt such that rotating the outer handle does not retract the door latch bolt, and in the unlocked state the outer handle is engaged to the door latch bolt such that rotating the outer handle retracts the door latch bolt.

6. The door lock mechanism of claim 1, wherein the inner handle comprises a first door knob and the outer handle comprises a second door knob.

7. The door lock mechanism of claim 1, wherein the inner handle comprises a first door lever and outer handle comprises a second door lever.

8. The door lock mechanism of claim 1, wherein two slots of the cross-hole intersect at a 90 degree angle, such that the second rotational orientation is rotated 90 degrees from the first rotational orientation.

9. A door lock mechanism kit configured to be assembled and installed on a door, comprising:

an outer handle operably coupled configured to be attached to a door latch bolt such that rotating the outer handle retracts the door latch bolt;

an inner handle configured to be operably coupled to the door latch bolt such that rotating the inner handle retracts the door latch bolt, the inner handle comprising a handle portion connected to a cylinder, the cylinder forming a cylindrical cavity which extends distally from the handle portion along a longitudinal axis;

a locking knob assembly comprising a locking knob connected to a locking bar, the locking knob forming a proximal end of the locking knob assembly and the locking bar extending distally from the locking knob to a distal end of the locking bar; the locking bar having a longitudinal cross-hole having a cross-shaped cross-section forming two intersecting slots such that the cross-hole is configured to receive a locking lever in one of the intersecting slots in a first rotational orientation and the cross-hole is configured to receive the locking lever in the other one of the intersecting slots in a second rotational orientation different than the first rotational orientation, the cross-hole having open end at the distal end of the locking bar, the locking bar rotatably received in the cylinder of the inner handle;

the locking lever comprising a flat bar having a proximal portion and a distal portion, the proximal portion of the locking lever configured to be inserted into either one of the two intersecting slots of the cross-hole, the distal portion of the locking lever configured to be operably coupled to a locking mechanism, the locking mechanism configured to be actuated between a locked state and an unlocked state by rotation of the locking lever which is rotatable by rotation of the locking knob, wherein in the locked state the locking mechanism prevents the outer handle from retracting the door latch bolt and in the unlocked state the locking mechanism enables the outer handle to retract the door latch bolt;

a guide sleeve disposed in the cylinder of the inner handle, the guide sleeve having a proximal tube portion and a distal tapered portion, the distal tapered portion extending distally from a distal end of the proximal tube portion and tapering radially outward as the distal tapered portion extends distally, the guide sleeve receiving the distal end of the locking bar such that the open end of the cross-hole is within the proximal tube portion, wherein the guide sleeve functions as a guide to direct the locking lever into the cross-hole of the locking bar during assembly of the door lock mechanism.

10. The door lock mechanism kit of claim 9, further comprising:

a guide sleeve stop disposed within the cylinder of the inner handle distal of the distal tapered portion of the guide sleeve, the guide sleeve stop configured to retain the guide sleeve in place within the cylinder of the inner handle.

11. The door lock mechanism kit of claim 9, wherein the locking bar comprises a cylindrical body with the cross-hole extending longitudinally within the cylindrical body.

12. The door lock mechanism kit of claim 9, wherein the locking mechanism is configured such that in the locked state the locking mechanism prevents the outer handle from being rotated to retract the door latch bolt, and in the unlocked state the locking mechanism allows the outer handle to be rotated to retract the door latch bolt.

13. The door lock mechanism kit of claim 9, wherein the locking mechanism comprises a clutch mechanism that is configured such that in the locked state the outer handle is disengaged from the door latch bolt such that rotating the outer handle does not retract the door latch bolt, and in the unlocked state the outer handle is engaged to the door latch bolt such that rotating the outer handle retracts the door latch bolt.

14. The door lock mechanism kit of claim 9, wherein the inner handle comprises a first door knob and the outer handle comprises a second door knob.

15. The door lock mechanism kit of claim 9, wherein the inner handle comprises a first door lever and outer handle comprises a second door lever.

16. The door lock mechanism kit of claim 9, wherein two slots of the cross-hole intersect at a 90 degree angle, such that the second rotational orientation is rotated 90 degrees from the first rotational orientation.

* * * * *